(12) United States Patent
Cheng et al.

(10) Patent No.: US 7,809,189 B2
(45) Date of Patent: Oct. 5, 2010

(54) METHOD FOR IMAGE SEPARATING

(75) Inventors: Min Cheng, Hangzhou (CN); Shui-Jun Lu, Hangzhou (CN); Miao Hu, Hangzhou (CN); Jin Wang, Hangzhou (CN)

(73) Assignee: Arcsoft, Inc., Fremont, CA (US)

( * ) Notice: Subject to any disclaimer, the term of this patent is extended or adjusted under 35 U.S.C. 154(b) by 937 days.

(21) Appl. No.: 11/652,638

(22) Filed: Jan. 12, 2007

(65) Prior Publication Data
US 2008/0170787 A1    Jul. 17, 2008

(51) Int. Cl.
*G06K 9/34*    (2006.01)

(52) U.S. Cl. .................. 382/173; 382/164; 382/171

(58) Field of Classification Search .................. 382/173, 382/224, 305, 209, 164, 171, 115, 177, 176, 382/180; 714/20, 26; 702/186; 718/103; 345/418; 358/403
See application file for complete search history.

(56) References Cited

U.S. PATENT DOCUMENTS 5,432,932 A * 7/1995 Chen et al. .................. 718/103
7,609,888 B2 * 10/2009 Sun et al. .................... 382/173
7,657,100 B2 * 2/2010 Gokturk et al. ............. 382/209
7,657,126 B2 * 2/2010 Gokturk et al. ............. 382/305
7,660,468 B2 * 2/2010 Gokturk et al. ............. 382/224

* cited by examiner

*Primary Examiner*—Anh Hong Do
(74) *Attorney, Agent, or Firm*—Bacon & Thomas, PLLC

(57) ABSTRACT

A method for image separating, said method being applied to an electronic apparatus to separate a foreground and a background of an image displayed on said apparatus, comprising the steps of scanning pixels in said image, applying arithmetic algorithm on said pixels and forming a plurality of segments on said image by defining pixels adjacent to each other and similar in color as one segment; examining foreground label and background label marked by an user; merging segments labeled by said foreground label into a foreground region and segments labeled by said background label into a background region, and applying arithmetic algorithm on an unlabeled segment to merge with an adjacent segment, foreground region or background region having the least difference in color; repeating said merging step until all segments are merged into a foreground region or a background region, thereby separating said image into a foreground region and a background region.

16 Claims, 15 Drawing Sheets

METHOD FOR IMAGE SEPARATING

FIELD OF THE INVENTION

The present invention relates to a method for image separating being applied to an electronic apparatus to precisely separate a foreground and a background of an image displayed on said apparatus.

BACKGROUND OF THE INVENTION

With rapid development in electronic technologies, enhancement in computer and peripheral products performance and more powerful while lower-priced software tools continuously hitting the market, these products have become popular commodities in daily lives. Take the digital camera market for example, to attract a good-sized of new consuming group, manufacturers not only diligently develop potent new models, but also bundle image processing software with their camera products. By installing and running the software on a computer, a user can view or edit images captured earlier with a digital camera. This not only help save cost on developing films but also offer a variety of editing and design capabilities on the images.

Despite the numerous image editing functions offered by image processing software available on the market, the thirst for a function providing fast and effective foreground/background separation of images remains unquenched. With conventional image processing software installed on a computer, a user is capable of opening a digital image, selecting a desirable tool (e.g. an eraser, a pen or a pair of scissors) from a tool box available in said software and editing the foreground and background objects in said digital image. If an object in the foreground is all the user prefers to keep, he can select the scissors tool and by controlling a mouse and looking at the computer display screen, gradually cut along the outline of said object until it is ultimately extracted from said image. However, in the case where said foreground object possesses a complex shape, a user can easily cut into said object due too fluctuation in handling a mouse. Although an undo function is available to the user, once it is performed, previously cut line is completely discarded, meaning all effort is wasted. The user must start from ground zero and cut from the very beginning again. In addition to highly discouraging a user from doing foreground extraction, repetitive cutting and undoing seriously deteriorates the effectiveness and quality of foreground editing. Consequently, most users stay away from such a conventional editing method of this sort.

To address this issue, a number of manufacturers developed extraction tools. For example, the Photoshop image processing software by Adobe Systems Incorporated provides tools such as magic wand, lasso, eraser and filters. Handling these tools, however, can be a complicate task for beginners and without a significant period of training and practicing, it is usually difficult for a user to master the skills required. Another company Corel Corporation offers extraction software called Corel Knockout which is capable of separating a foreground object with fine edge details (e.g. feather, animal fur, shadow, hair strands, smoke and transparent materials) from a background and paste said extracted object onto another desired background. Despite the amazing effect, a user does need to precisely depict the inner edge and outer edge at the outline of a foreground object to accomplish the result. The difficulty of the task increases exponentially when the foreground object has plenty of angles or protruding parts. Tremendous time and effort is required in order to be able to extract an object of this nature.

To solve the above-mentioned drawbacks, Microsoft Corporation developed an extraction tool called Lazy Snapping. A user makes a few strokes of drawing on the foreground and background of an image and then the software intelligently extract the foreground from the background. Adobe Systems incorporated also include a specialized function called Magic Extract in their Photoshop Element 4.0 image processing software for easy separation of a foreground object from a background. While the above two software programs offer a more convenience extraction procedure, they are still lagging in providing a tool with easily operations and real-time results.

Therefore, facilitating a tool with intelligent functions so that users can extract a foreground object by simply applying a few pen strokes on the foreground and background of an image has become a goal in research and development of most manufacturers. With such a tool, long hours of training and practice can be spared while the separation remains accurate at the boundary where mutual penetration of foreground and background takes place to produce a realistic and precise extraction of a foreground object.

SUMMARY OF THE INVENTION

After considerable research and experimentation, a method for image separating according to the present invention has been developed so as to overcome the drawbacks of inability to provide real-time results and simple operation associated with said prior art while drastically increasing the processing speed and accuracy of foreground separation especially at the boundary where mutual penetration of foreground and background takes place.

It is an object of the present invention to provide a method for image separating, said method being applied to an electronic apparatus to separate a foreground and a background of an image displayed on said apparatus, said method comprising the steps of scanning pixels in said image, applying arithmetic algorithm on said pixels and forming a plurality of segments on said image by defining pixels adjacent to each other and similar in color as one segment; examining foreground label and background label marked by an user; merging segments labeled by said foreground label into a foreground region and segments labeled by said background label into a background region, and applying arithmetic algorithm on an unlabeled segment to merge with an adjacent segment, foreground region or background region having the least difference in color; repeating said merging step until all segments are merged into a foreground region or a background region, thereby separating said image into a foreground region and a background region.

It is another object of the present invention to provide a method for image separating, after said image has been separated into said foreground region and said background region, said method further comprises the steps of scanning the boundary between said foreground region and said background region, forming an extension region along said boundary according to a ratio of a dominant color of said foreground region in the neighborhood of said boundary versus a dominant color of said background region in the neighborhood of said boundary, said extension region comprising the widest part of mutual penetration between said foreground region and said background region; and performing mathematical clustering on the foreground color and background color near the border of said extension region, then selecting a set of foreground and background colors having the best match to the current pixel color in said extension region as the respective foreground or background color for said current pixel, thereby, with said fine processing, precisely separating foreground and background near said boundary with mutual penetration.

The above and other objects, features and advantages of the present invention will become apparent from the following detailed description taken with the accompanying drawings.

BRIEF DESCRIPTION OF THE DRAWINGS

The features, objects and advantages of the invention will become more apparent from the detailed description set forth below when taken in conjunction with the drawings in which like references characters identify correspondingly throughout, and wherein.

DETAILED DESCRIPTION OF THE PREFERRED EMBODIMENTS

Figure 1:
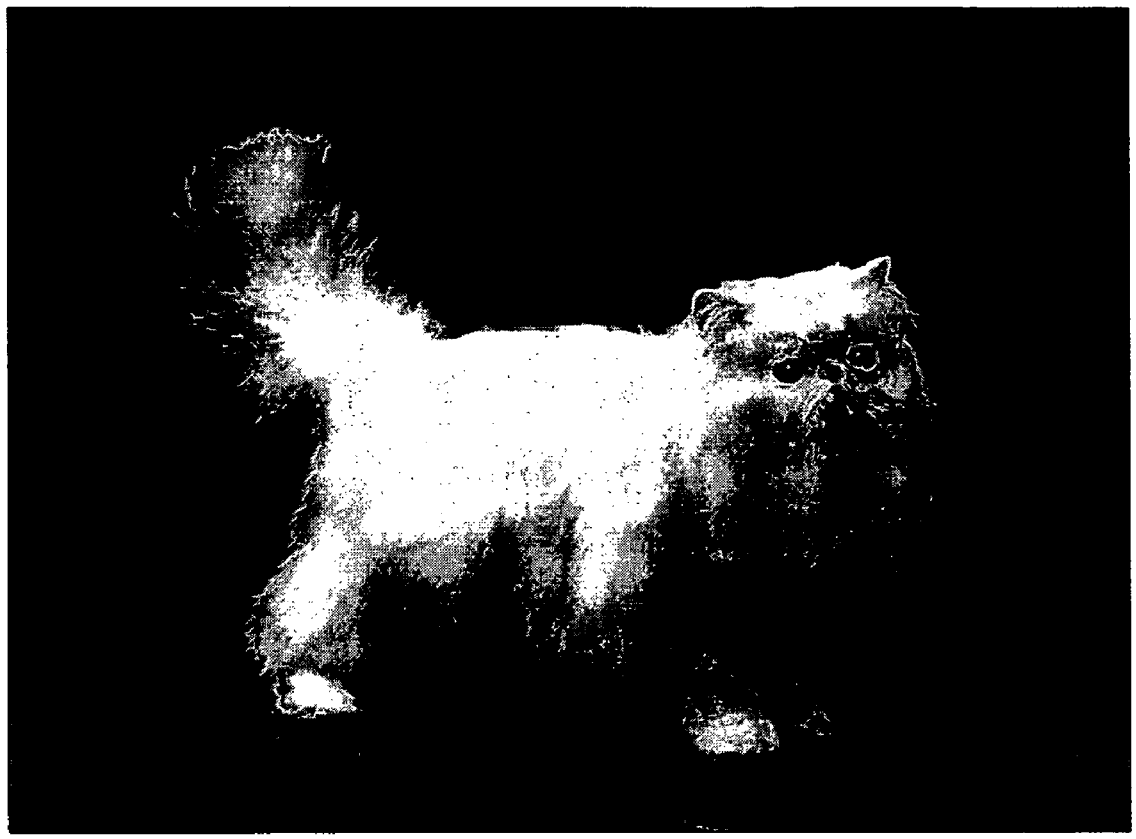
FIG. 1 is an image shown on a display screen.
Figure 2:
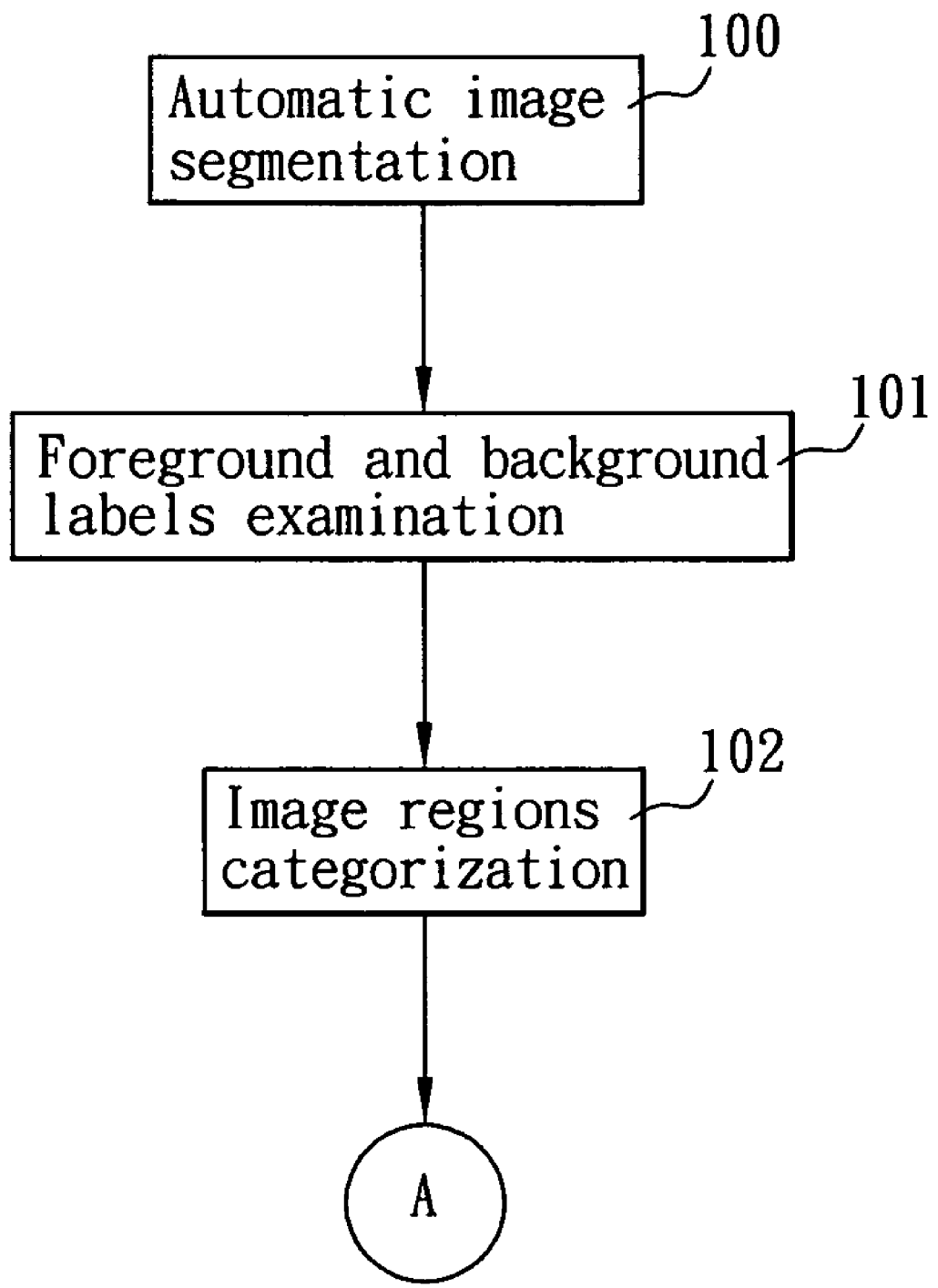
FIG. 2 is a flow chart illustrating the image separating procedure according to the present invention.

The present invention relates to a method for image separating, said method being applied to an electronic apparatus, said apparatus can be a desktop computer, a notebook computer or a palm computer with a display screen. Said electronic apparatus displays the image read onto said display screen. Refer to FIG. 1. A user separates a foreground from a background of an image by controlling said electronic apparatus to follow the procedure in FIG. 2.

Figure 3:
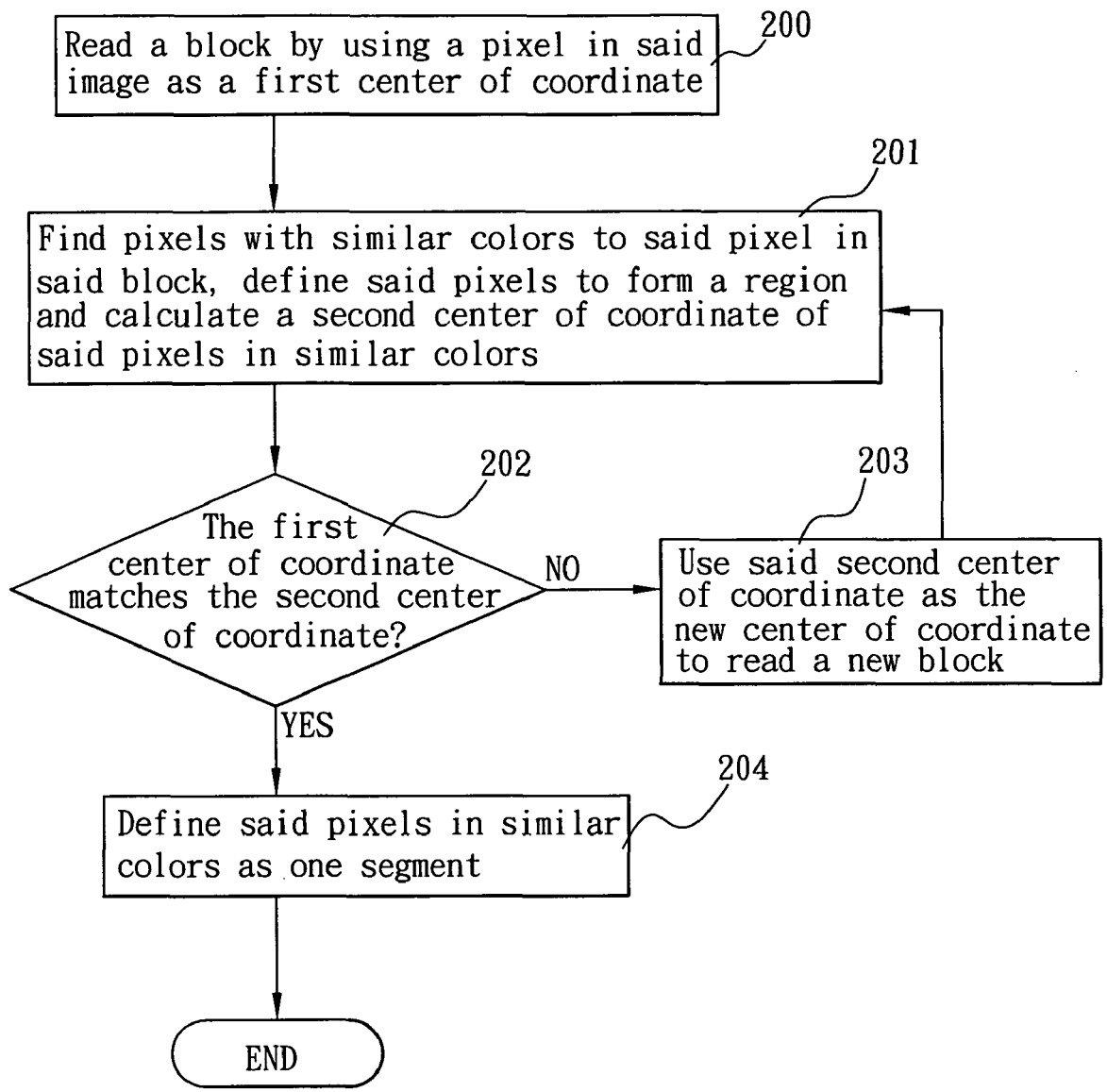
FIG. 3 is a flow chart illustrating an image segmentation procedure according to the present invention.

(100) Automatic image segmentation: scanning pixels in said image, applying arithmetic algorithm on said pixels and forming a plurality of segments on said image by defining pixels adjacent to each other and similar in color as one segment. In a preferred embodiment of the present invention, said arithmetic algorithm implemented is a Mean Shift algorithm which tracks the movement of the center of nearby pixels similar in color to quickly determine pixels belonging to the same segment. Refer to FIG. 3. The following steps apply to each pixel.

(200) Read a block by using a pixel in said image as a first center of coordinate.

(201) Find pixels with similar colors to said pixel in said block, define said pixels to form a region and calculate a second center of coordinate of said pixels in similar colors.

(202) Determine whether said first center of coordinate matches the second center of coordinate. If so, go to step (204), else go to step (203).

(203) Use said second center of coordinate as the new center of coordinate to read a new block. Go to step (201).

(204) Define said pixels in similar colors as one segment.

Figure 4:
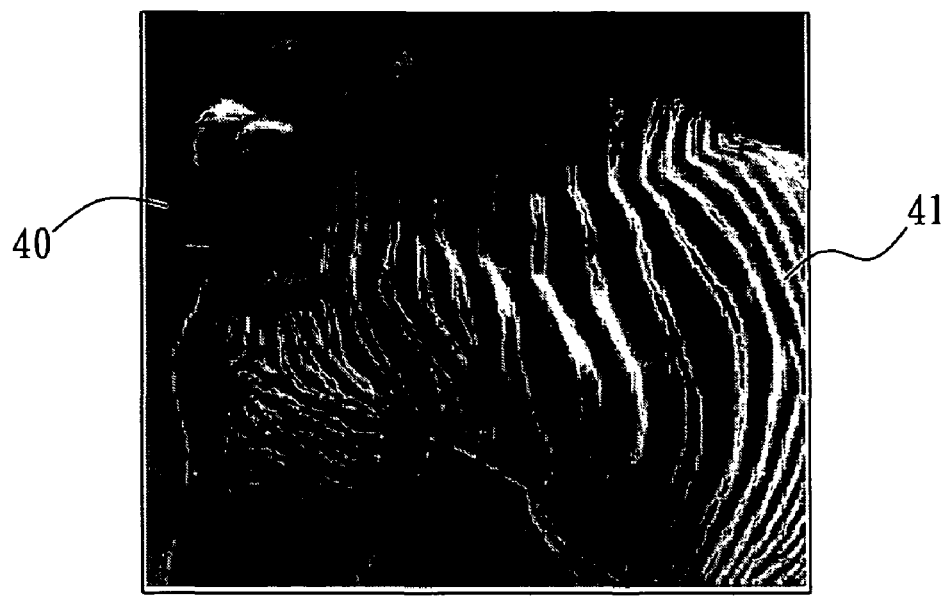
FIG. 4 is an image of a grass-eating zebra on a pasture in Africa
Figure 5:
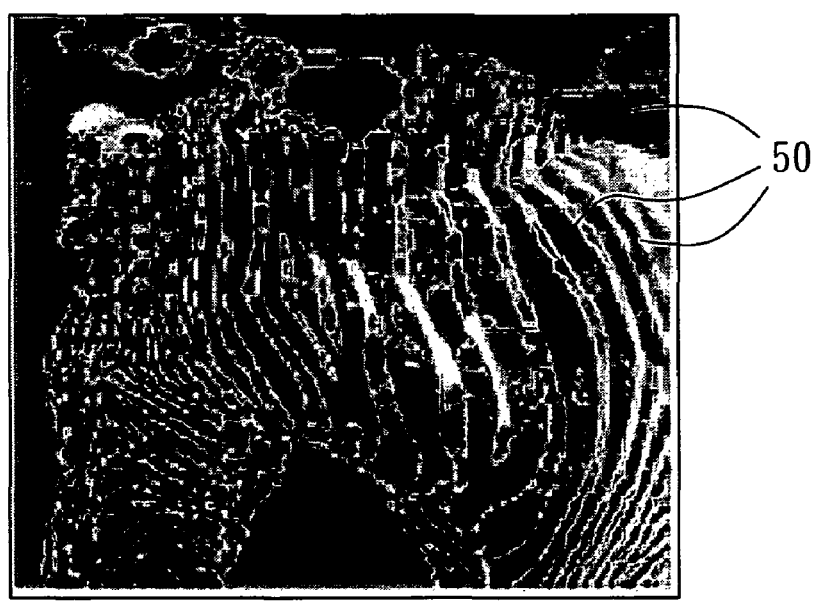
FIG. 5 is a segmented image of said zebra image in FIG. 4.

As a result, said image is separated into a plurality of segments according to the color blocks distribution of said image. Refer to FIG. 4, taking an image 41 of a grass-eating zebra on a pasture in Africa as an example. After said Automatic image segmentation procedure is performed on said image 41, a plurality of segments 50 are formed on said image by defining pixels adjacent to each other and similar in color as one segment. The above-mentioned is only a preferred embodiment of the present invention. Those skilled in the art could employ other arithmetic algorithms which separate an image into a plurality of segments by defining pixels adjacent to each other and similar in color as one segment fall in the scope of the "separation arithmetic algorithm" of the present invention.

Figure 6:
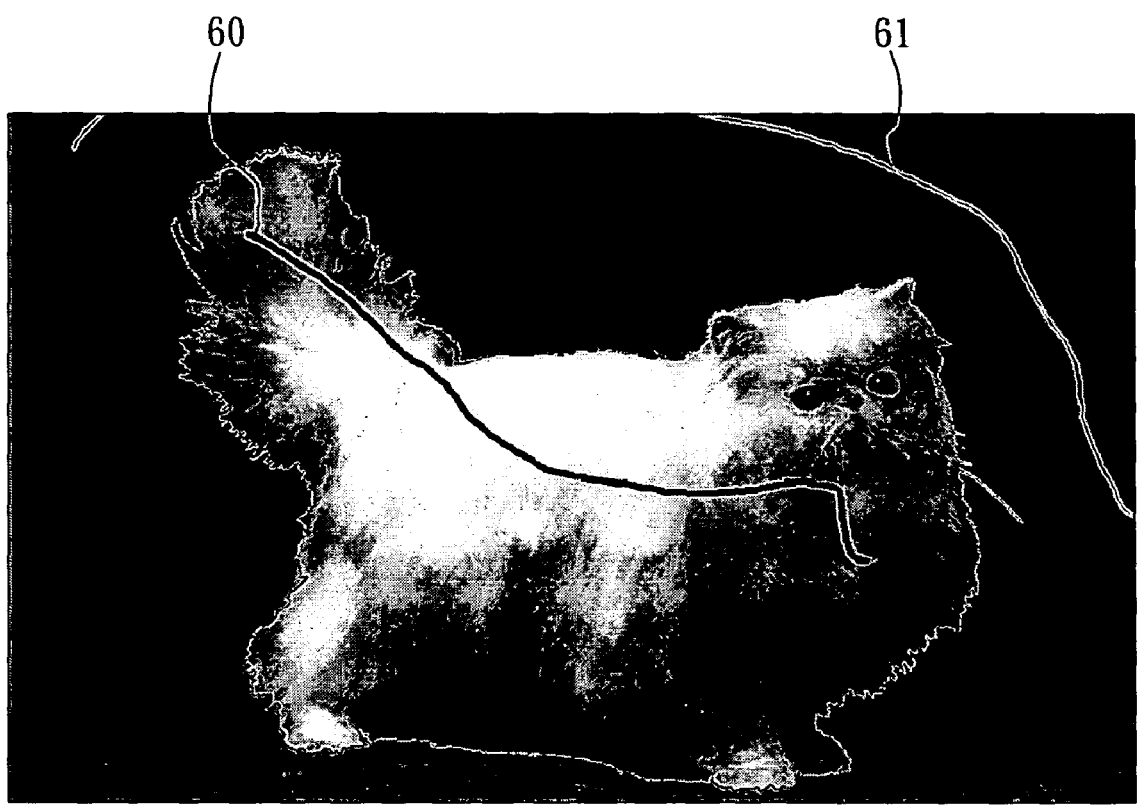
FIG. 6 shows foreground labels and background labels marked by an user.

(101) Foreground and background labels examination: examining foreground and background labels marked by a user on said image as depicted in FIG. 6. In a preferred embodiment of the present invention, the user draws a red line 60 on the foreground of said image as the foreground position label by using a red paintbrush tool, and draws a green line 61 on the background of said image as the background position label by using a green paintbrush tool. From now on in this specification, a segment marked with a foreground label (red line 60) or a background label (green line 60) will be called a seeded segment of a foreground region or a back ground region, respectively. A segment not marked with a foreground or back ground label will be referred to as a non-seeded segment.

Figure 7:
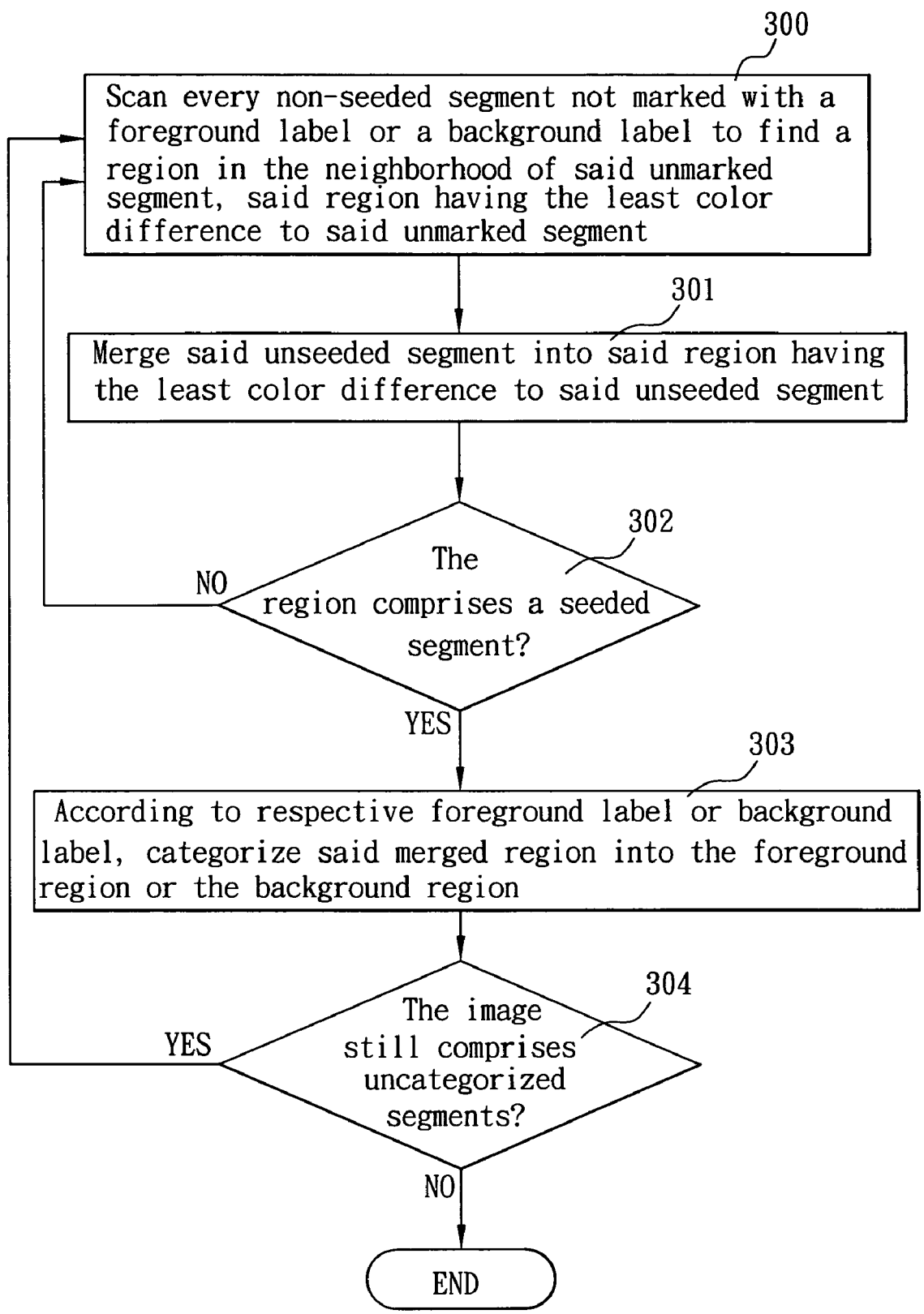
FIG. 7 is a flow chart illustrating a region categorization procedure of an image according to the preset invention.

(102) Image regions categorization: merging segments labeled by said foreground label (red line) into a foreground region and segments labeled by said background label (green line) into a background region, and applying arithmetic algorithm on an unlabeled segment to merge with an adjacent segment, foreground region or background region having the least difference in color. In a preferred embodiment of the present invention, the categorization arithmetic algorithm adopted is the adjacent regions merging algorithm as depicted in FIG. 7 as follows.

(300) Scan every non-seeded segment not marked with a foreground label or a background label to find a region in the neighborhood of said unmarked segment, said region having the least color difference to said unmarked segment;

(301) Merge said unseeded segment into said region having the least color difference to said unseeded segment.

(302) Determine whether said region comprises a seeded segment? If so, go to step (303), else go to step (300).

(303) According to respective foreground label or background label, categorize said merged region into the foreground region or the background region.

(304) Determine whether said image still comprises uncategorized segments, if so, go to step (300), else it means all segments have been merged into the foreground region or the background region and complete the categorization arithmetic algorithm. Consequently, the whole image is separated into the foreground region and the background region.

Figure 8:
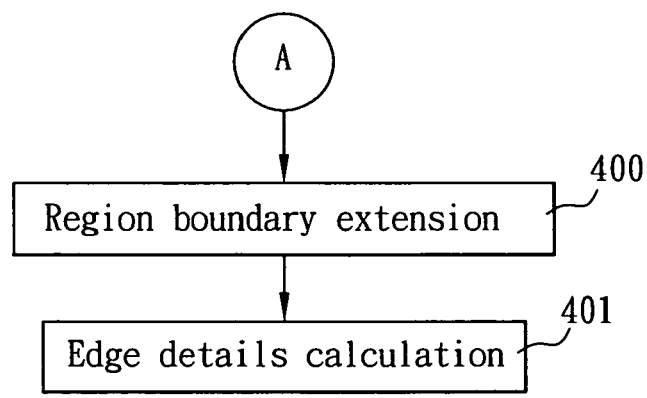
FIG. 8 is a flow chart illustrating a procedure for separating foreground and background near a boundary with mutual penetration according to the preset invention.

In the present invention, after the whole image has been separated into the foreground region and the background region, to precisely distinguish and separate foreground and background near a boundary of said regions with mutual penetration, the method further comprises the steps illustrated in FIG. 8.

Figure 9:
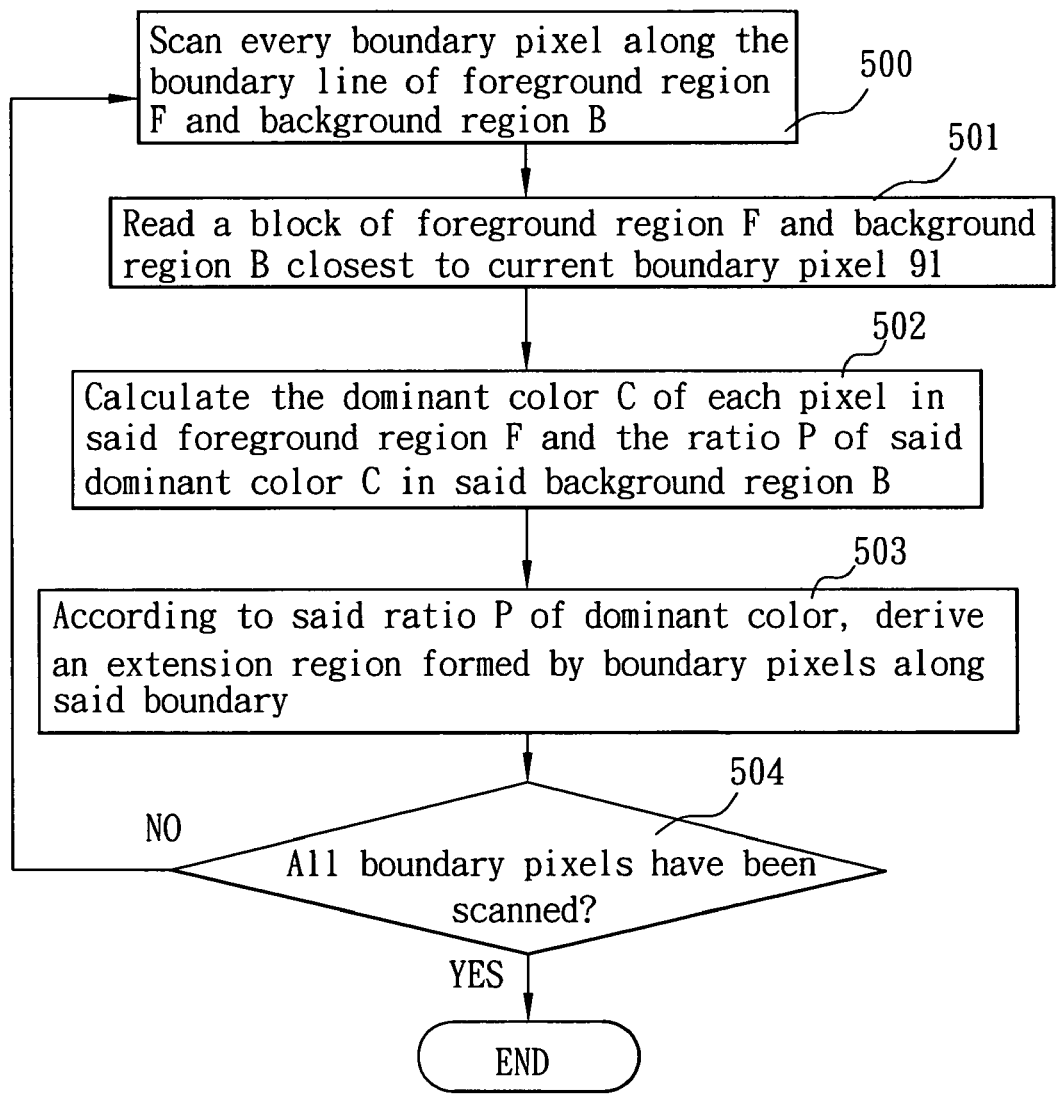
FIG. 9 is a flow chart illustrating a region boundary extension procedure of an image according to the preset invention.

(400) Region boundary extension: scanning the boundary between said foreground region and said background region, forming an extension region along said boundary according to a ratio of a dominant color of said foreground region in the neighborhood of said boundary versus a dominant color of said background region in the neighborhood of said boundary, said extension region comprising the widest part of mutual penetration between said foreground region and said background region. This arithmetic algorithm is called an adaptive boundary extension algorithm. The purpose of performing this algorithm is to aim at the portion where mutual penetration of foreground and background is serious. For example, the portion containing objects with hair strands or shadows in the foreground which penetrate deep into the background. In this case, an extended region with a larger width enables a more precise separation of hair strands or shadows from the background. For the other areas near the boundary which don't contain much mutual penetration of the foreground and the background, only a narrow extension region is adopted to reduce unnecessary processing time. Refer to FIG. 9 for the steps of said adaptive boundary extension algorithm.

Figure 10:
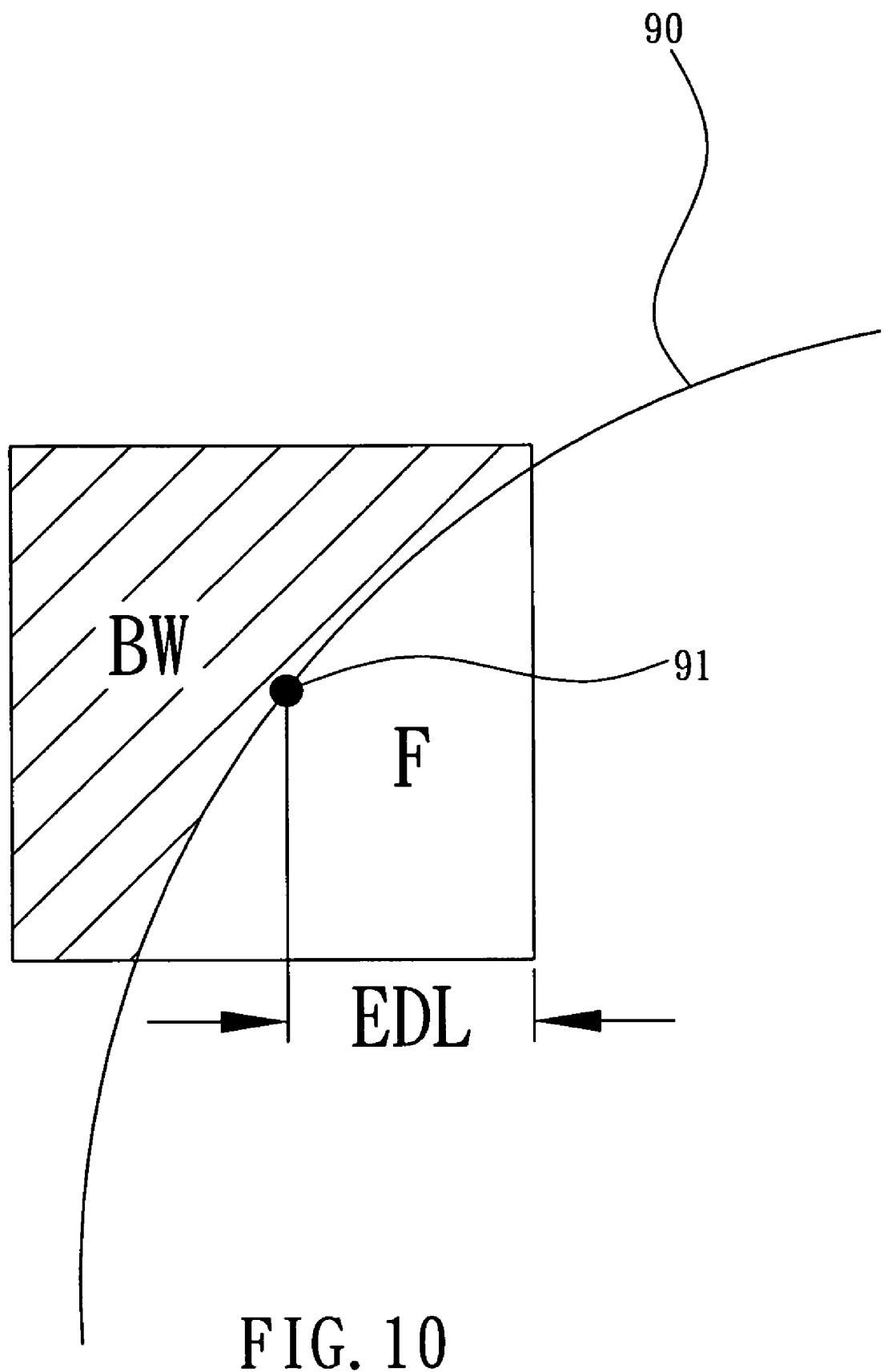
FIG. 10 is a local zoomed-in view of a foreground and background boundary in an image.

(500) Refer to FIG. 10. Scan every boundary pixel 91 along the boundary line 90 of foreground region F and background region B.

(501) According to a user-defined edge detail level (EDL), read a block of foreground region F and background region B closest to current boundary pixel 91. Said EDL is defined by the user to cover as much the portion with serious mutual penetration of foreground and background as possible, e.g. areas having hair strands or shadows, while keeping away from the portion without mutual penetration.

(502) Calculate the dominant color C of each pixel in said foreground region F and the ratio P of said dominant color C in said background region B.

(503) According to said ratio P of dominant color, derive an extension region formed by boundary pixels along said boundary. In a preferred embodiment of the present invention, when said ratio P is between 80% and 30%, said current boundary pixel is used as the center and said EDL as the radius to form a circular extension region. When said ratio P is less than 30% and greater than 10%, said current boundary pixel is used as the center and half of said EDL as the radius to draw a smaller circular extension region. In the case that said ratio P is greater than 80% or less than 10%, said current boundary pixel is used as the center and 1 as the radius to draw an even smaller circular extension region. The above-mentioned is only a preferred embodiment of the present invention. Those skilled in the art could employ other arithmetic algorithms with a different ratio, radius and shape of extension region while deriving an extension region formed by boundary pixels along said boundary in accordance to said ratio P of dominant color without deviating from the scope of the "adaptive boundary extension algorithm" of the present invention.

(504) Determine whether all boundary pixels have been scanned. If not, go to step (500). If so, all respective extension regions corresponding to said boundary pixels are obtained, therefore completing the execution of the algorithm.

Figure 11:
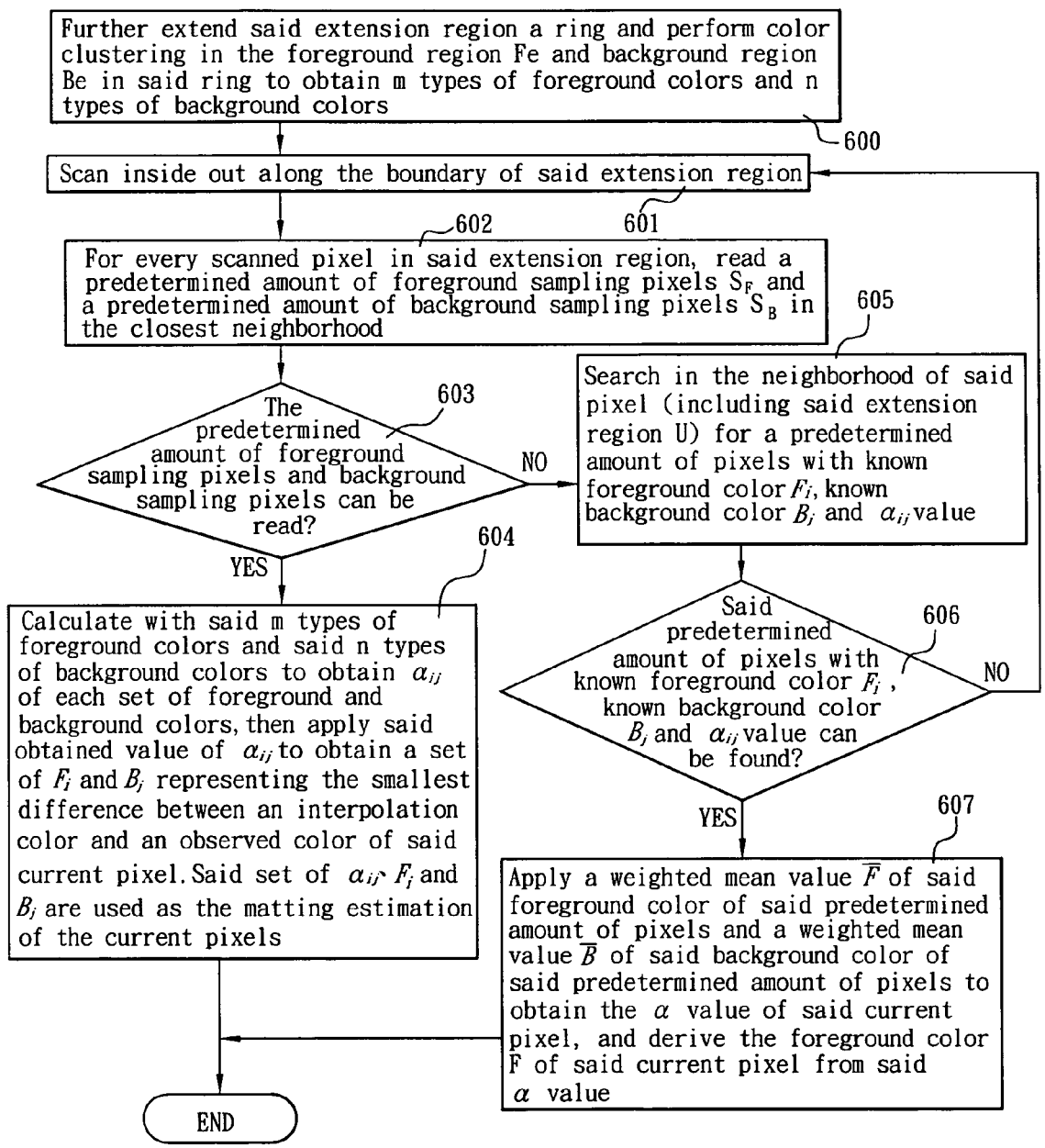
FIG. 11 is a flow chart illustrating an edge detail calculation procedure of an image according to the preset invention.

(401) Edge details calculation: performing mathematical clustering analysis on the foreground color and background color near the border of said extension region, then selecting a set of foreground and background colors having the best match to the current pixel color in said extension region as the respective foreground or background color for said current pixel. In a preferred embodiment of the present invention, Bayesian Matting algorithm is adopted for calculation of said edge details of said extension region. Refer to FIG. 11 for the steps.

Figure 12:
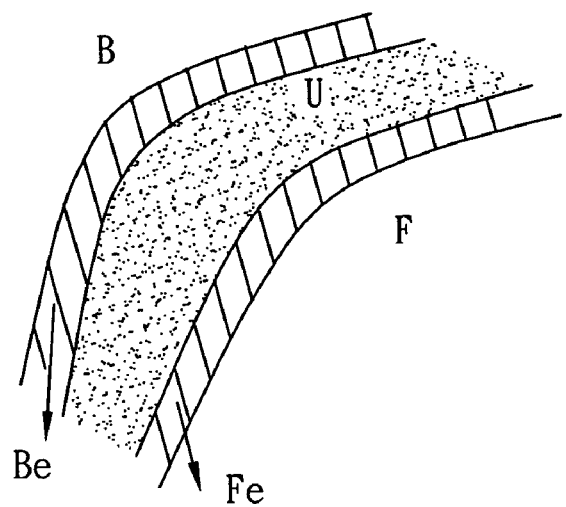
FIG. 12 is a zoomed-in view of an extension region on a foreground and background boundary.

(600) Refer to FIG. 12. Further extend said extension region a ring and perform color clustering in the foreground region Fe and background region Be in said ring to obtain m types of foreground colors and n types of background colors. As a result, each pixel in the vicinity of said extension region U is assigned a foreground color $F_i$ or a background color $B_j$. Said foreground color $F_i$ or background color $B_j$ will be used later in the calculation of pixel alpha values of said extension region.

(601) Scan inside out along the boundary of said extension region U.

Figure 13:
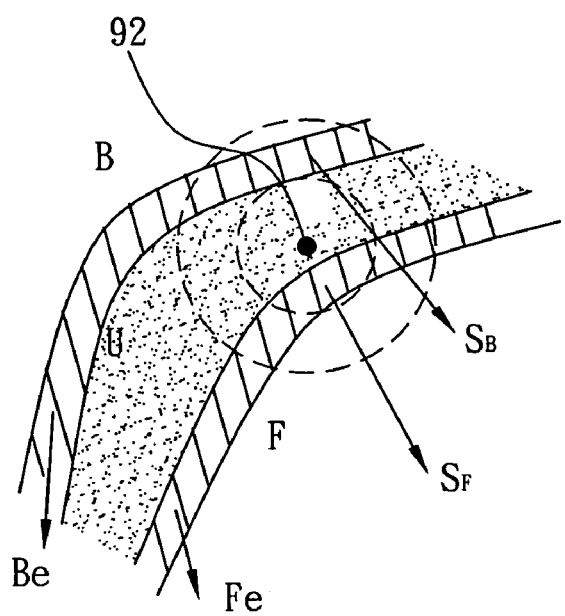
FIG. 13 is a zoomed-in view of foreground sampling pixels $S_F$ and background sampling pixels $S_B$ of an image.

(602) Refer to FIG. 13. For every scanned pixel 92 in said extension region, read a predetermined amount of foreground sampling pixels SF and a predetermined amount of background sampling pixels SB in the closest neighborhood. 50 nearby foreground sampling pixels and 50 background sampling pixels are read in said preferred embodiment. However, the number is not limited to the one chosen in said preferred embodiment when implementing the present invention.

(603) Determine whether said predetermined amount of foreground sampling pixels and background sampling pixels can be read? If so, go to step (604), else go to step (605).

(604) Applying on said m types of foreground colors and said n types of background colors with the following equation $$\alpha_{ij} = \frac{(C - B_j) \cdot (F_i - B_j)}{(F_i - B_j) \cdot (F_i - B_j)}$$

to obtain $\alpha_{ij}$ of each set of foreground and background colors, then apply said obtained value of $\alpha_{ij}$ into a interpolation equation of $C_{ij} = \alpha_{ij} F_i + (1 - \alpha_{ij}) B_j$ to obtain a set of $F_i$ and $B_j$ representing the smallest difference between an interpolation color and an observed color of said current pixel, e.g. $\min \Delta C = \min \| C - C_{ij} \|$. Thus, said set of $\alpha_{ij}$, $F_i$ and $B_j$ can be used as the matting estimation of the current pixels in said extension region U.

(605) Search in the neighborhood of said pixel (including said extension region U) for a predetermined amount of pixels with known foreground color $F_i$, known background color $B_j$ and $\alpha_{ij}$ value. In said preferred embodiment, 50 such pixels are found. However, the number is not limited to the one chosen in said preferred embodiment when implementing the present invention.

(606) Determine whether said predetermined amount of pixels with known foreground color $F_i$, known background color $B_j$ and $\alpha_{ij}$ value can be found? If so, go to step (607), else go to step (601).

Figure 14:
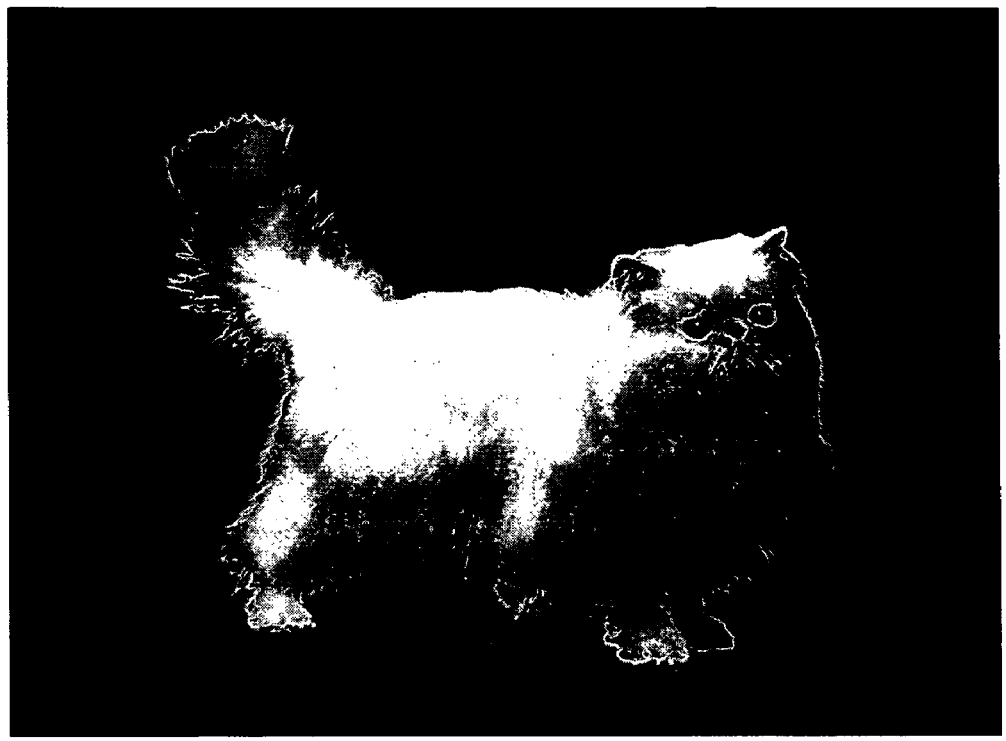
FIG. 14 shows the separated foreground object from the background of the image in FIG. 1.
Figure 15:
FIG. 15 shows with said fine processing, how precisely foreground can be separated from background near a boundary with mutual penetration.

(607) Apply a weighted mean value $\overline{F}$ of said foreground color of said predetermined amount of pixels and a weighted mean value $\overline{B}$ of said background color of said predetermined amount of pixels into the equation of $$\alpha = \frac{(C - \overline{B}) \cdot (\overline{F} - \overline{B})}{(\overline{F} - \overline{B}) \cdot (\overline{F} - \overline{B})}$$

to obtain the $\alpha$ value of said current pixel, and apply the equation of $F = (C - (1-\alpha)\overline{B})/\alpha$ to derive the foreground color F of said current pixel from said $\alpha$ value. FIG. 14 and FIG. 15 show that for the image in FIG. 1, the portion with serious foreground and background mutual penetration can be more precisely separated with the above-mentioned fine processing.

In a preferred embodiment of the present invention, in order to provide an option of better distinguishing and therefore separating a foreground object from the background according to the selection of a user, after said image has been separated into a foreground region and a background region, the method offers two extra procedures, e.g. local edge details calculation and local edge smoothing calculation. Said local edge details calculation has the same algorithm as said Bayesian Matting algorithm applied on said extension region described earlier. The only difference is that said Bayesian Matting algorithm was automatically performed on said extension region, while the local edge details calculation is performed only on a user-defined local region selected by using a soft brush tool offered by the present invention. However, In other embodiments of the present invention, other easy matting algorithms, such as Poisson Matting algorithm, Lazy Snapping algorithm, and Belief Propagation Based Iterative Optimization Approach algorithm, etc., are also applicable to this application to replace said Bayesian Matting algorithm for being performed on the above mentioned user-defined local region.

Figure 16:
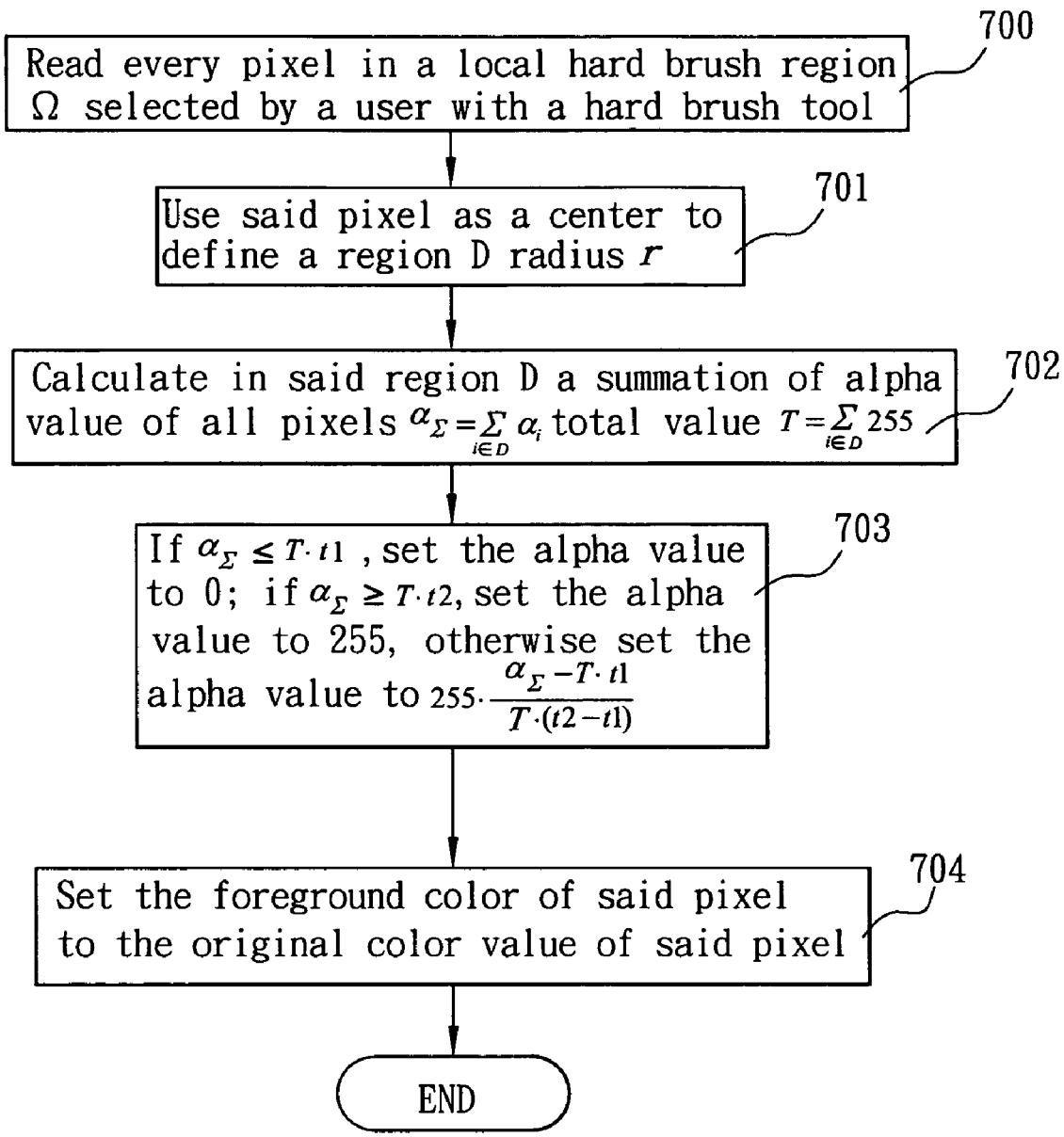
FIG. 16 is a flow chart illustrating a local edge smoothing procedure of an image according to the preset invention.

On the other hand, local edge smoothing calculation is performed on another user-defined local region selected by using a hard brush tool offered by the present invention. The algorithm adopted is a morphological algorithm as described in FIG. 16 as follows.

(700) Read every pixel in a local hard brush region $\Omega$ selected by a user with a hard brush tool.

(701) Use said pixel as a center to define a region D with the radius r of said region D being determined by the following scheme. Let the shortest distance from said pixel to the boundary of said region $\Omega$ be d and half of the width of said hard brush region $\Omega$ be w, if d<w then r=d, otherwise r=w.

(702) Calculate in said region D a summation of alpha value of all pixels $$\alpha_\Sigma = \sum_{i \in D} \alpha_i$$

and a total value $$T = \sum_{i \in D} 255.$$

(703) If $\alpha_\Sigma$ represents a minor portion of T ($\alpha_\Sigma \leq T \cdot t1$), set the alpha value of said pixel to 0; if $\alpha_\Sigma$ represents a major portion of T ($\alpha_\Sigma \geq T \cdot t2$), then set the alpha value of said pixel to 255, otherwise apply an equation of $$255 \cdot \frac{\alpha_\Sigma - T \cdot t1}{T \cdot (t2 - t1)}$$

to set the alpha value of said pixel. Said values t1 and t2 are threshold values and they meet the condition $0 \leq t1 < t2 \leq 1$. In a preferred embodiment of the present invention, t1=0.45 and t2=0.6.

(704) Set the foreground color of said pixel to the original color value of said pixel.

Figure 17:
FIG. 17 is an image of an elderly man with a white beard.
Figure 18:
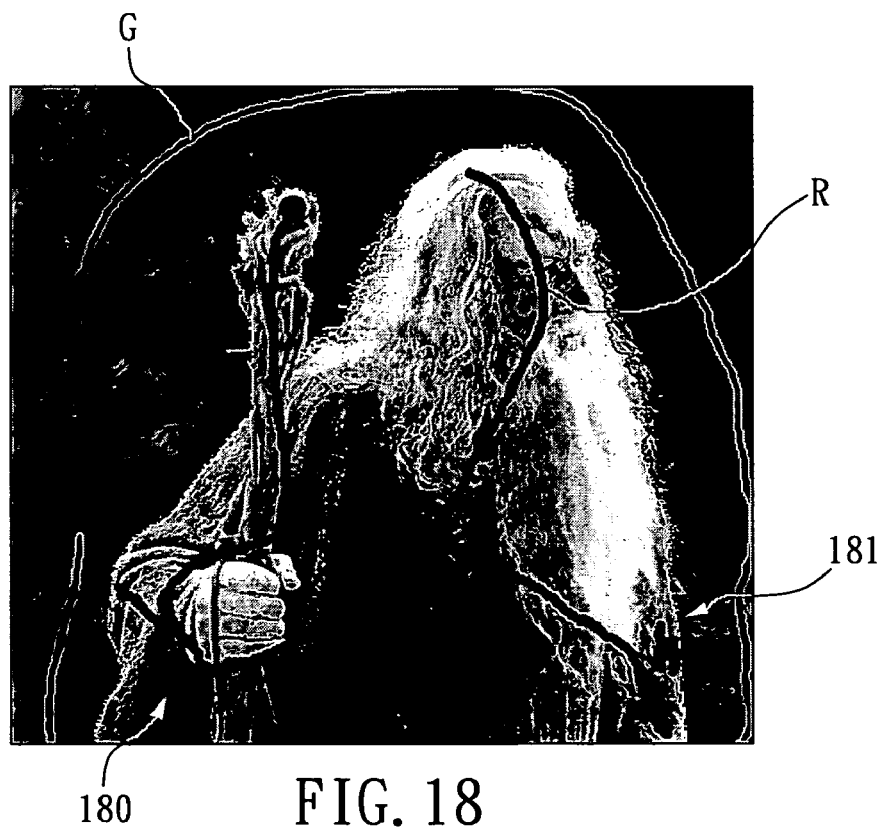
FIG. 18 shows foreground and background labels on the image of FIG. 17 marked by a user.

Following the above-mentioned procedures, for the majority of images, only three steps are required by a user to extract a foreground object from its background. Refer to FIG. 17 where an image of an elderly man with a white beard is taken as an example. The steps are:

(1) First step: Refer to FIG. 18. The user randomly draws a red line R with a red foreground brush on the foreground object to be extracted (e.g. the body of said white-bearded elderly man) in the image to form a foreground label. Said red line can be drawn anywhere on the targeted foreground object. It does not have to be exactly along the outline of the body of said elderly man, nor is it required to follow any other specific rules.

Figure 19:
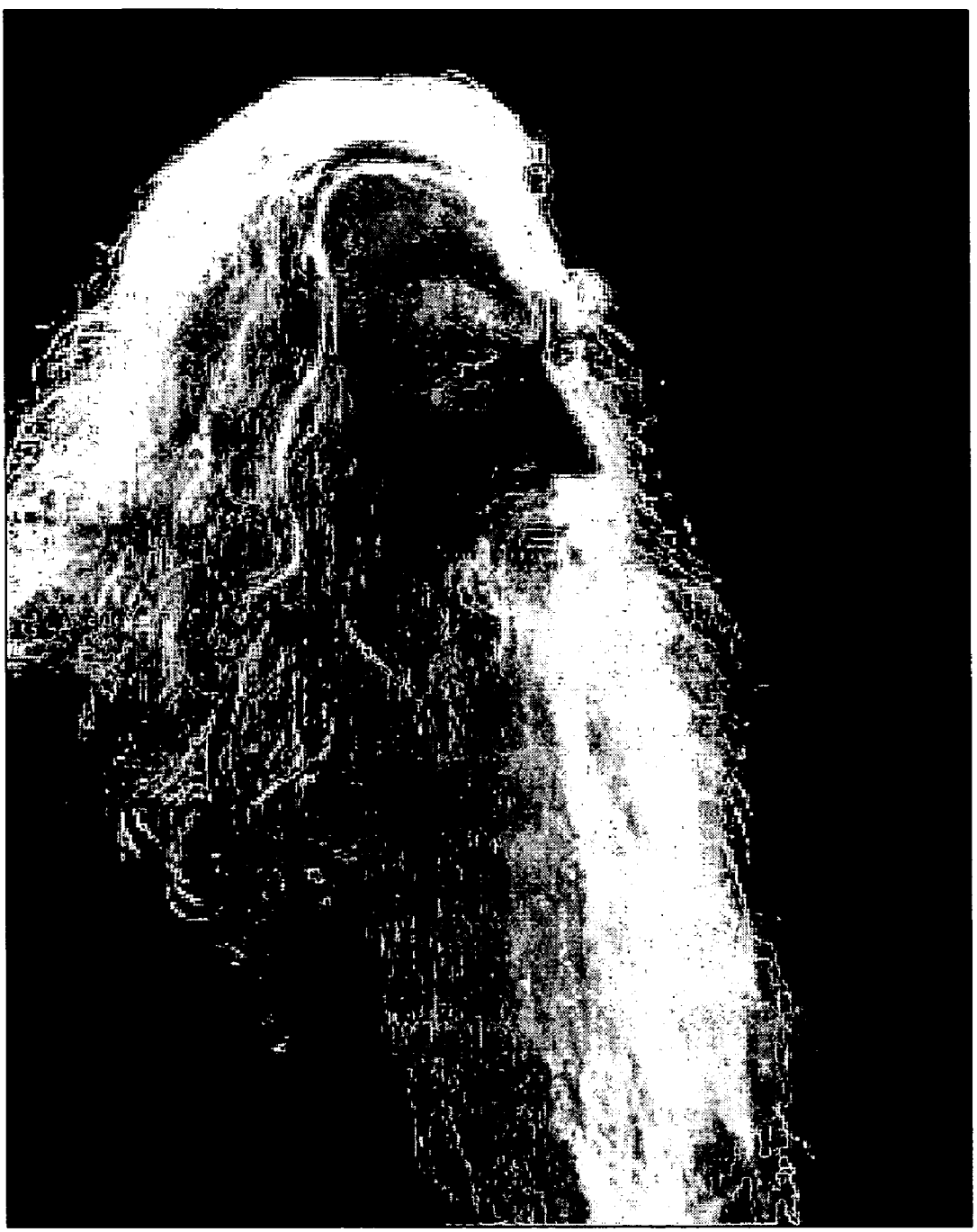
FIG. 19 shows new foreground and background labels on the image of FIG. 17 re-marked by a user.

(2) Second step: The user randomly draws a green line G on the background to be discarded with a green background brush to form a background label. After the performing the method of the present invention, said targeted foreground object is extracted from said background, as depicted in FIG. 18. In said foreground object, areas having shadows of sleeve 180 and beard 181 have similar colors near the boundary to said background, affecting the correctness in distinguishing said targeted foreground from said background in said areas. Errors such as mistakenly categorizing a portion of said background to the foreground region or a portion of said foreground to the background region may occur. To rectify these errors, the user simply re-marks with said foreground brush and background brush on the incorrectly categorized areas to form new respective foreground labels and background labels as shown in FIG. 19. The method will then be able to further process said image and precisely extract said foreground object from said background.

Figure 20:
FIG. 20 shows the width of an extension region set on the image of FIG. 17 by a user.

(3) Third step: To more precisely separate hair strands and bear strands of said elderly man from said background, an EDL must be defined so that the boundary width can cover as much as possible the areas where mutual penetration of foreground and background is serious (e.g. hair strands and shadows), as depicted in FIG. 20. Accordingly, the areas with foreground and background penetration can be fine processed by said method and therefore more precisely separated.

While the invention herein disclosed has been described by means of specific embodiments, numerous modifications and variations could be made thereto by those skilled in the art without departing from the scope and spirit of the invention set forth in the claims.

What is claimed is:

1. A method for image separating, said method being applied to an electronic apparatus to separate a foreground and a background of an image displayed on said electronic apparatus, said method comprising the following steps executed on said electronic apparatus:

scanning pixels in said image, applying arithmetic algorithm on said pixels and forming a plurality of segments on said image by defining pixels adjacent to each other and similar in color as one segment;

examining foreground label and background label marked on said image by a user through said electronic apparatus;

merging segments labeled by said foreground label into a foreground region and segments labeled by said background label into a background region, and applying arithmetic algorithm on an unlabeled segment to merge with an adjacent segment, said foreground region or said background region having the least difference in color;

repeating said merging step until all segments are merged into said foreground region or said background region, thereby separating said image into said foreground region and said background region.

2. The method of claim 1, wherein in defining pixels adjacent to each other and similar in color as one segment, the step further comprises:

reading a block by using a pixel in said image as a first center of coordinate;

finding pixels with similar colors to said pixel in said block, defining said pixels to form a region and calculating a second center of coordinate of said pixels in similar colors; and when said first center of coordinate matches the second center of coordinate, defining said pixels in similar colors as one segment and performing new calculation on another pixel in another undefined segment; when said first center of coordinate does not match said second center of coordinate, using said second center of coordinate as the new center of coordinate, reading a new block and repeat the previous two steps until the centers of coordinates of two consecutive calculations match and thereby segments defined.

3. The method of claim 2, wherein in merging segments labeled by said foreground label into a foreground region and segments labeled by said background label into a background region, the step further comprises:

scanning every segment not marked with a foreground label or a background label to find a region in the neighborhood of said unmarked segment, said region having the least color difference to said unmarked segment;

merging said unmarked segment into said region having the least color difference to said unmarked segment; and determining whether said region comprises a segment marked by a foreground label or a background label; if said region is determined to have comprised a segment marked by a foreground label or a background label, according to respective foreground label or background label, categorizing said merged region into the foreground region or the background region; if said region is determined to have not comprise a segment marked by a foreground label or a background label, determining whether said image comprises uncategorized segments, when said image is determined to have comprise uncategorized segments, repeat the previous two steps until all segments are merged into either said foreground region or said background region.

4. The method of claim 3 further comprises the steps of:

scanning the boundary between said foreground region and said background region, forming an extension region along said boundary according to a ratio of a dominant color of said foreground region in the neighborhood of said boundary versus a dominant color of said background region in the neighborhood of said boundary, said extension region comprising the widest part of mutual penetration between said foreground region and said background region; and performing mathematical clustering on the foreground color and background color near the border of said extension region, then selecting a set of foreground and background colors having the best match to the current pixel color in said extension region as the respective foreground or background color for said current pixel, thereby precisely separating foreground and background near said boundary with mutual penetration.

5. The method as in claim 3 further comprises the steps of:

providing a first tool;

defining a local region selected by said first tool as an extension region for the portion having mutual penetration of said foreground region and said background region; and performing mathematical clustering on the foreground color and background color near the border of said extension region, then selecting a set of foreground and background colors having the best match to the current pixel color in said extension region as the respective foreground or background color for said current pixel, thereby precisely separating foreground and background in said mutual penetration portion of said local region selected by said first tool.

6. The method as in claim 3 further comprises the steps of:

providing a second tool;

performing edge smoothing calculation on a local region selected by said second tool.

7. The method of claim 6, wherein said edge smoothing calculation comprises:

reading every pixel in a local hard brush region selected by a user with a hard brush tool;

using said pixel as a center to define a region D, the radius of said region D being determined by the distance from said pixel to a boundary of said hard brush region, if said distance is less than half of the width of said hard brush region, said radius of region D being set to said distance, if said distance is not less than half of the width of said hard brush region, said radius of region D being set to half of the width of said hard brush region;

calculating in said region D a summation of alpha value of all pixels $\alpha_\Sigma$ and a total value T, if $\alpha_\Sigma$ represents a minor portion of T ($\alpha_\Sigma \leq T \cdot t1$), then setting the alpha value of said pixel to 0, if $\alpha_\Sigma$ represents a major portion of T ($\alpha_\Sigma \geq T \cdot t2$), then setting the alpha value of said pixel to 255, if $\alpha_\Sigma$ is between a minor portion of T and a major portion of T ($T \cdot t1 < \alpha_\Sigma < T \cdot t2$), then applying an equation of $$255 \cdot \frac{\alpha_\Sigma - T \cdot t1}{T \cdot (t2 - t1)}$$

to set the alpha value of said pixel, said values t1 and t2 can be 0.45 and 0.6, respectively;

setting the foreground color of said pixel to the original color value of said pixel.

8. The method of claims 4, wherein when forming said extension region along said boundary, the step further comprises:
    scanning every boundary pixel along the boundary line of said foreground region and said background region;
    according to a user-defined edge detail level, reading a block of foreground region and background region closest to current boundary pixel;
    calculating the dominant color of each pixel in said foreground region and the ratio of said dominant color in said background region;
    according to said ratio of dominant color, deriving an extension region formed by boundary pixels along said boundary; and
    determining whether all boundary pixels are scanned, if not all boundary pixels are scanned, repeating previous step until all extension regions corresponding to said boundary pixels are obtained.

9. The method of claims 5, wherein when forming said extension region along said boundary, the step further comprises:
    scanning every boundary pixel along the boundary line of said foreground region and said background region;
    according to a user-defined edge detail level, reading a block of foreground region and background region closest to current boundary pixel;
    calculating the dominant color of each pixel in said foreground region and the ratio of said dominant color in said background region;
    according to said ratio of dominant color, deriving an extension region formed by boundary pixels along said boundary; and
    determining whether all boundary pixels are scanned, if not all boundary pixels are scanned, repeating previous step until all extension regions corresponding to said boundary pixels are obtained.

10. The method of claims 7, wherein when forming said extension region along said boundary, the step further comprises:
    scanning every boundary pixel along the boundary line of said foreground region and said background region;
    according to a user-defined edge detail level, reading a block of foreground region and background region closest to current boundary pixel;
    calculating the dominant color of each pixel in said foreground region and the ratio of said dominant color in said background region;
    according to said ratio of dominant color, deriving an extension region formed by boundary pixels along said boundary; and
    determining whether all boundary pixels are scanned, if not all boundary pixels are scanned, repeating previous step until all extension regions corresponding to said boundary pixels are obtained.

11. The method of claim 8, wherein when performing mathematical clustering on the foreground color and background color of said extension region, the step further comprises:
    further extending said extension region for a ring and performing color clustering on pixels in the foreground region and background region in said ring to obtain a plurality of foreground colors $F_i$ and a plurality of background colors $B_j$;
    scanning inside out along the boundary of said extension region;
    for every scanned pixel in said extension region, reading a predetermined amount of foreground sampling pixels and a predetermined amount of background sampling pixels in the closest neighborhood;
    determining whether said predetermined amount of foreground sampling pixels and background sampling pixels can be read, if said predetermined amount of foreground sampling pixels and background sampling pixels is determined can be read, applying on said plurality of foreground colors and said plurality of background colors with an equation of $$\alpha_{ij} = \frac{(C - B_j) \cdot (F_i - B_j)}{(F_i - B_j) \cdot (F_i - B_j)}$$

to obtain $\alpha_{ij}$ of each set of foreground and background colors, then applying said obtained value of $\alpha_{ij}$ into a interpolation equation of $C_{ij} = \alpha_{ij} F_i + (1 - \alpha_{ij}) B_j$ to obtain a set of $F_i$ and $B_j$ representing the smallest difference between an interpolation color and an observed color of said current pixel (min $\Delta C = \min \|C - C_{ij}\|$), and using said set of $\alpha_{ij}$, $F_i$ and $B_j$ as the matting estimation of the current pixels in said extension region.

12. The method of claim 9, wherein when performing mathematical clustering on the foreground color and background color of said extension region, the step further comprises:
    further extending said extension region for a ring and performing color clustering on pixels in the foreground region and background region in said ring to obtain a plurality of foreground colors $F_i$ and a plurality of background colors $B_j$;
    scanning inside out along the boundary of said extension region;
    for every scanned pixel in said extension region, reading a predetermined amount of foreground sampling pixels and a predetermined amount of background sampling pixels in the closest neighborhood;
    determining whether said predetermined amount of foreground sampling pixels and background sampling pixels can be read, if said predetermined amount of foreground sampling pixels and background sampling pixels is determined can be read, applying on said plurality of foreground colors and said plurality of background colors with an equation of $$\alpha_{ij} = \frac{(C - B_j) \cdot (F_i - B_j)}{(F_i - B_j) \cdot (F_i - B_j)}$$

to obtain $\alpha_{ij}$ of each set of foreground and background colors, then applying said obtained value of $\alpha_{ij}$ into a interpolation equation of $C_{ij} = \alpha_{ij} F_i + (1 - \alpha_{ij}) B_j$ to obtain a set of $F_i$ and $B_j$ representing the smallest difference between an interpolation color and an observed color of said current pixel (min $\Delta C = \min \|C - C_{ij}\|$), and using said set of $\alpha_{ij}$, $F_i$ and $B_j$ as the matting estimation of the current pixels in said extension region.

13. The method of claim 10, wherein when performing mathematical clustering on the foreground color and background color of said extension region, the step further comprises:
    further extending said extension region for a ring and performing color clustering on pixels in the foreground region and background region in said ring to obtain a plurality of foreground colors $F_i$ and a plurality of background colors $B_j$;

scanning inside out along the boundary of said extension region;

for every scanned pixel in said extension region, reading a predetermined amount of foreground sampling pixels and a predetermined amount of background sampling pixels in the closest neighborhood;

determining whether said predetermined amount of foreground sampling pixels and background sampling pixels can be read, if said predetermined amount of foreground sampling pixels and background sampling pixels is determined can be read, applying on said plurality of foreground colors and said plurality of background colors with an equation of $$\alpha_{ij} = \frac{(C - B_j) \cdot (F_i - B_j)}{(F_i - B_j) \cdot (F_i - B_j)}$$

to obtain $\alpha_{ij}$ of each set of foreground and background colors, then applying said obtained value of $\alpha_{ij}$ into a interpolation equation of $C_{ij}=\alpha_{ij}F_i+(1-\alpha_{ij})B_j$ to obtain a set of $F_i$ and $B_j$ representing the smallest difference between an interpolation color and an observed color of said current pixel (min $\Delta C=\min\|C-C_{ij}\|$), and using said set of $\alpha_{ij}$, $F_i$ and $B_j$ as the matting estimation of the current pixels in said extension region.

14. The method of claim 11, wherein if said predetermined amount of foreground sampling pixels and background sampling pixels is determined can not be read, further comprises the steps of:

searching in the neighborhood of said pixel for a predetermined amount of pixels with known foreground color $F_i$, known background color $B_j$ and $\alpha_{ij}$ value;

determining whether said predetermined amount of pixels with known foreground color $F_i$, known background color $B_j$ and $\alpha_{ij}$ value can be found, if said predetermined amount of pixels with known foreground color $F_i$, known background color $B_j$ and $\alpha_{ij}$ value can be found, applying a weighted mean value $\overline{F}$ of said foreground color of said predetermined amount of pixels and a weighted mean value $\overline{B}$ of said background color of said predetermined amount of pixels into an equation of $$\alpha = \frac{(C - \overline{B}) \cdot (\overline{F} - \overline{B})}{(\overline{F} - \overline{B}) \cdot (\overline{F} - \overline{B})}$$

to obtain the $\alpha$ value of said current pixel, and applying an equation of $F=(C-(1-\alpha)\overline{B})/\alpha$ to derive the foreground color F of said current pixel from said $\alpha$ value.

15. The method of claim 12, wherein if said predetermined amount of foreground sampling pixels and background sampling pixels is determined can not be read, further comprises the steps of:

searching in the neighborhood of said pixel for a predetermined amount of pixels with known foreground color $F_i$, known background color $B_j$ and $\alpha_{ij}$ value;

determining whether said predetermined amount of pixels with known foreground color $F_i$, known background color $B_j$ and $\alpha_{ij}$ value can be found, if said predetermined amount of pixels with known foreground color $F_i$, known background color $B_j$ and $\alpha_{ij}$ value can be found, applying a weighted mean value $\overline{F}$ of said foreground color of said predetermined amount of pixels and a weighted mean value $\overline{B}$ of said background color of said predetermined amount of pixels into an equation of $$\alpha = \frac{(C - \overline{B}) \cdot (\overline{F} - \overline{B})}{(\overline{F} - \overline{B}) \cdot (\overline{F} - \overline{B})}$$

to obtain the $\alpha$ value of said current pixel, and applying an equation of $F=(C-(1-\alpha)\overline{B})/\alpha$ to derive the foreground color F of said current pixel from said $\alpha$ value.

16. The method of claim 13, wherein if said predetermined amount of foreground sampling pixels and background sampling pixels is determined can not be read, further comprises the steps of:

searching in the neighborhood of said pixel for a predetermined amount of pixels with known foreground color $F_i$, known background color $B_j$ and $\alpha_{ij}$ value;

determining whether said predetermined amount of pixels with known foreground color $F_i$, known background color $B_j$ and $\alpha_{ij}$ value can be found, if said predetermined amount of pixels with known foreground color $F_i$, known background color $B_j$ and $\alpha_{ij}$ value can be found, applying a weighted mean value $\overline{F}$ of said foreground color of said predetermined amount of pixels and a weighted mean value $\overline{B}$ of said background color of said predetermined amount of pixels into an equation of $$\alpha = \frac{(C - \overline{B}) \cdot (\overline{F} - \overline{B})}{(\overline{F} - \overline{B}) \cdot (\overline{F} - \overline{B})}$$

to obtain the $\alpha$ value of said current pixel, and applying an equation of $F=(C-(1-\alpha)\overline{B})/\alpha$ to derive the foreground color F of said current pixel from said $\alpha$ value.

* * * * *